UNITED STATES PATENT OFFICE.

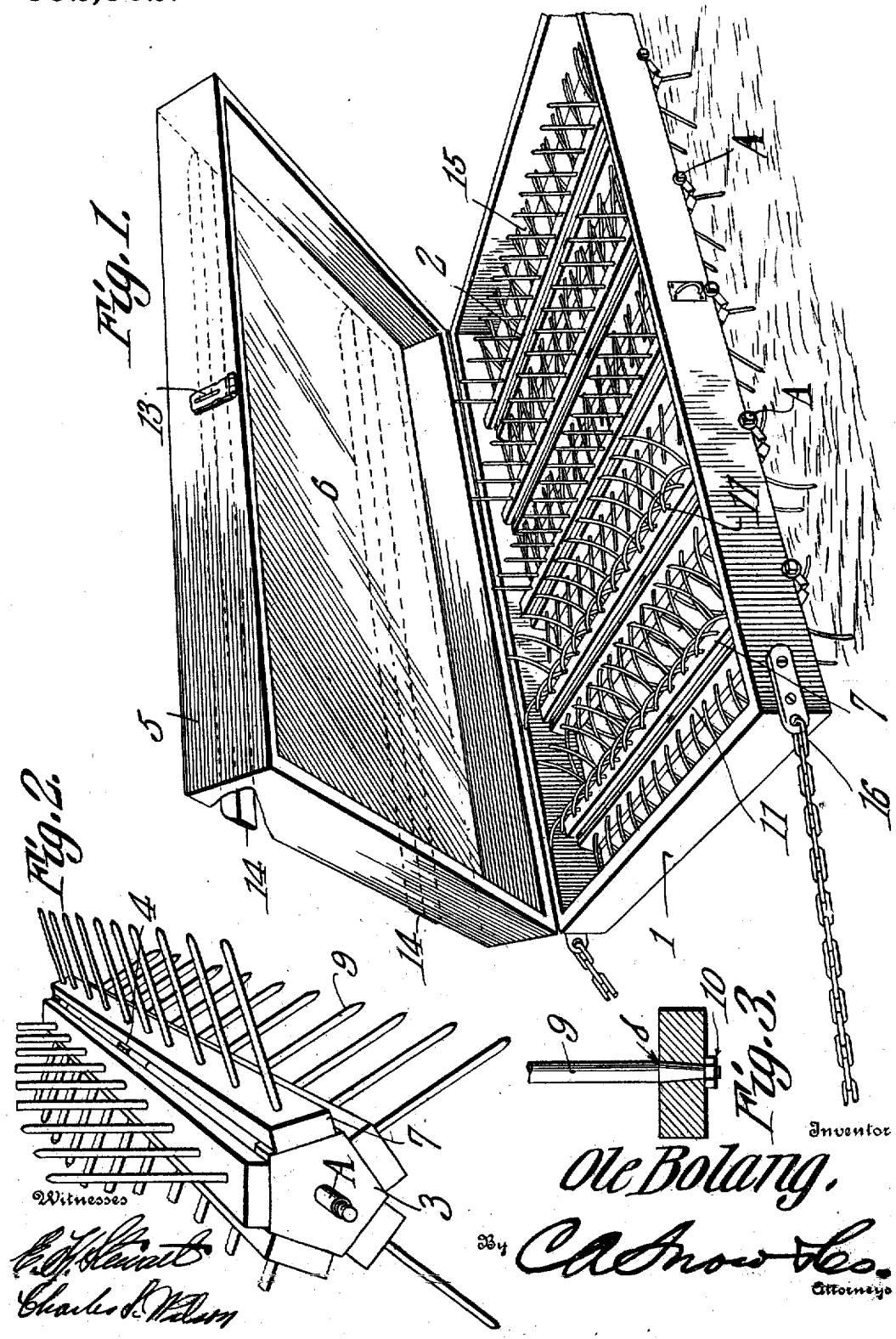

OLE BOLANG, OF LAKE CITY, MINNESOTA.

HARROW.

952,502.

Specification of Letters Patent. Patented Mar. 22, 1910.

Application filed July 15, 1909. Serial No. 507,808.

*To all whom it may concern:*

Be it known that I, OLE BOLANG, a citizen of the United States, residing at Lake City, in the county of Wabasha and State of Minnesota, have invented a new and useful Harrow, of which the following is a specification.

It is the object of this invention to provide a harrow comprising hingedly connected parts, so united that the harrow may be inverted piecemeal when an obstruction is encountered, or when it is desired to turn the harrow over so that the same may be moved from place to place upon runners which constitute a part of the structure.

Another object of the invention is to provide a harrow one part of which may be turned back to form a receptacle for tools and the like, while the harrow is being repaired.

The drawings show but one form of the invention, and it is to be understood that changes, properly falling within the scope of what is claimed may be made, without departing from the spirit of the invention.

Like numerals denote like parts in the drawings, wherein—

Figure 1 is a perspective showing the lid of the harrow raised; Fig. 2 is a perspective of one of the elements which constitute a mounting for the teeth of the harrow; and Fig. 3 is a fragmental transverse section designed to show the manner in which the teeth are mounted and held in place.

The harrow includes a frame 1, with one end of which is connected the draft rigging 16. A lid 5, box-like in structure, and having depending sides receivable by the upper edges of the frame, is hinged to the frame along the line of contact between one of the sides and the frame, for movement transversely of the draft line of the harrow. Runners 14 are mounted upon the top of the lid 5, to extend in the direction of the draft line of the device, the lid being tiltable to bring the runners into bearing with the earth, independently of the frame. A locking device 13, of any desired form, may be employed to hold the lid 5 upon the frame. The device includes two relatively heavy sets of elements, one of which sets includes the harrow teeth, hereinafter described, and the rollers whereby they are carried, the other of which sets includes the runners. When it is desired to turn the harrow over, the lid 5 may first be swung upon its hinges to bring the runners 14 into contact with the ground. Subsequently, the frame 1 carrying the teeth, may be swung over upon the lid, thus completely inverting the device, it being noted that the weight of the harrow is divided in the operation of inverting the device.

Owing to the fact that the lid 5 is provided with depending sides, the runners 14 may be brought fairly into bearing with the ground when the lid is swung over, without straining the hinges whereby the lid is connected with the frame. It may also be noted that when the lid is swung open and brought into bearing with the ground, the interior of the lid presents a box-like receptacle 6, in which tools may be placed while the harrow is being repaired. Should the harrow strike an obstruction, the same having traversed a part of the longitudinal dimension of the harrow, the harrow may be lifted from such obstruction without undue effort upon the part of the operator, by first throwing the lid 5 over and subsequently tilting the frame 1 over to rest upon the lid, an operation obviously more easily accomplished than the inversion of the device as an entity.

Passing now to a detail description of the teeth of the harrow and the manner in which they are mounted in the frame 1, it will be seen that a plurality of axles A are journaled for rotation in the frame 1, transversely of the same. Each of these axles A carries a roller 2, comprising polygonal end blocks 3, and an intermediate block 4 of the same contour as the end blocks. Upon these several blocks are secured slats 7, having openings 8, adapted, as shown most clearly in Fig. 3, to receive the tapered ends of the teeth 9, the said teeth being secured in place by means of nuts 10. The teeth of the forward rollers 11 are curved slightly to decrease the strain upon the forward portion of the device, and rake teeth 15 are carried by the rear of the frame 1 to complete the harrowing operation.

Having thus described the invention, what is claimed is:—

A harrow comprising a frame; teeth carried by the frame; draft rigging connected with the frame; a box-like lid having depending sides receivable by the upper edges of the frame; the lid being hinged to the frame along the line of contact between one of the sides and the frame for movement transversely of the draft line of the harrow; runners mounted upon the upper face of the lid and extended in the direction of the draft line of the harrow; the lid being tiltable to bring the runners into bearing with the earth, independently of the frame.

In testimony that I claim the foregoing as my own, I have hereto affixed my signature in the presence of two witnesses.

OLE BOLANG.

Witnesses:
   HENRIETTA PHILLIPS,
   JAMES E. PHILLIPS.